United States Patent
Constantinof

(10) Patent No.: US 7,899,174 B1
(45) Date of Patent: Mar. 1, 2011

(54) EMERGENCY SERVICES FOR PACKET NETWORKS

(75) Inventor: Cristian Constantinof, Kanata (CA)

(73) Assignee: Nortel Networks Limited, St. Laurent, Quebec (CA)

(*) Notice: Subject to any disclaimer, the term of this patent is extended or adjusted under 35 U.S.C. 154(b) by 2145 days.

(21) Appl. No.: 10/606,687

(22) Filed: Jun. 26, 2003

(51) Int. Cl.
*H04M 7/00* (2006.01)

(52) U.S. Cl. ........ 379/221.02; 379/37; 379/45; 370/352; 709/204

(58) Field of Classification Search ............. 379/221.02, 379/37, 45; 370/352; 709/204
See application file for complete search history.

(56) References Cited

U.S. PATENT DOCUMENTS

| | | | |
|---|---|---|---|
| 5,572,442 A | 11/1996 | Schulhof et al. | |
| 5,987,331 A * | 11/1999 | Grube et al. | 455/509 |
| 6,119,143 A | 9/2000 | Dias et al. | |
| 6,182,149 B1 | 1/2001 | Nessett et al. | |
| 6,219,346 B1 | 4/2001 | Maxemchuk | |
| 6,256,771 B1 | 7/2001 | O'Neil et al. | |
| 6,314,409 B2 | 11/2001 | Schneck et al. | |
| 6,370,234 B1 * | 4/2002 | Kroll | 379/45 |
| 6,490,624 B1 | 12/2002 | Sampson et al. | |
| 6,724,874 B2 * | 4/2004 | Fleischer et al. | 379/196 |
| 6,775,534 B2 * | 8/2004 | Lindgren et al. | 455/404.1 |
| 6,801,948 B2 | 10/2004 | Clark et al. | |
| 6,868,450 B1 | 3/2005 | Lucovsky | |
| 6,885,874 B2 * | 4/2005 | Grube et al. | 455/520 |
| 6,904,521 B1 | 6/2005 | Jivsov | |
| 6,944,133 B2 | 9/2005 | Wisner et al. | |
| 6,944,150 B1 | 9/2005 | McConnell et al. | |
| 7,171,678 B2 | 1/2007 | Buehl et al. | |
| 7,342,918 B2 | 3/2008 | Keenan et al. | |
| 2001/0025316 A1 | 9/2001 | Oh | |
| 2002/0049930 A1 | 4/2002 | Hannigan | |
| 2002/0052962 A1 | 5/2002 | Cherkasova et al. | 709/229 |
| 2002/0078383 A1 | 6/2002 | Leerssen et al. | |
| 2003/0016676 A1 | 1/2003 | Allen et al. | |
| 2003/0140145 A1 | 7/2003 | Lindberg et al. | |
| 2004/0190522 A1 * | 9/2004 | Aerrabotu et al. | 370/395.3 |
| 2007/0121590 A1 * | 5/2007 | Turner et al. | 370/352 |

FOREIGN PATENT DOCUMENTS

| | | |
|---|---|---|
| EP | 0841825 A2 | 5/1998 |
| WO | WO 01/86972 A2 | 11/2001 |

OTHER PUBLICATIONS

European Search Report for EP 04291218.8 mailed Sep. 28, 2004.
Office Action from U.S. Appl. No. 10/439,531 mailed Feb. 15, 2008.
Office Action from U.S. Appl. No. 10/439,531 mailed Aug. 21, 2007.
Office Action from U.S. Appl. No. 10/439,531 mailed Mar. 30, 2007.

* cited by examiner

*Primary Examiner* — Quynh H Nguyen
(74) *Attorney, Agent, or Firm* — Withrow & Terranova, PLLC

(57) ABSTRACT

The present invention provides a technique for facilitating emergency services via packet networks. Emergency service providers will implement emergency proxies to ensure that proper call setup requests for emergency services are forwarded to the appropriate entities, even if those entities are in overload conditions. The emergency proxies may authenticate and filter call setup requests to ensure that only proper call setup requests are forwarded to help prevent such overload conditions. The emergency proxies may operate solely in a packet network, as well as at the interface between a packet network and a circuit-switched network to assist in call setup requests originating from either the packet network or the circuit-switched network.

31 Claims, 5 Drawing Sheets

EMERGENCY SERVICES FOR PACKET NETWORKS

FIELD OF THE INVENTION

The present invention relates to communications, and in particular to ensuring emergency calls supported in part over a packet network are properly handled, even during overload conditions.

BACKGROUND OF THE INVENTION

Providing emergency services, especially in overload conditions, is challenging since service providers have to ensure that emergency calls are established regardless of other non-emergency calls. In the public switched telephone network (PSTN), there are mechanisms to identify calls made from and to special locations which involve providing emergency services. These locations include 911 call centers, police departments, hospitals, fire stations, and various government agencies. Generally, excessive network resources are reserved to ensure completion of emergency calls, and call setup requests for requesting the establishment of a call are given processing priority when they are within the various switching nodes within the PSTN. Accordingly, the PSTN currently has the ability to properly prioritize and handle emergency calls.

With respect to packet-based communications, packet networks are increasingly being used to deploy voice-based communications using various types of voice over packet (VoP) calls. Unfortunately, the openness of packet-based architectures has presented a challenge for properly handling emergency calls. Although there are numerous packet-based devices which can filter and route calls, this is no overriding solution for ensuring emergency calls are properly processed and prioritized over non-emergency calls. Further, there is a need to ensure that emergency calls can be properly handled in overload conditions as well as ensure that the system is not abused by malicious users who improperly identify their calls as emergency calls or initiate malicious attacks, such as denial of service attacks.

SUMMARY OF THE INVENTION

The present invention provides a technique for facilitating emergency services via packet networks. Emergency service providers will implement emergency proxies to ensure that proper call setup requests for emergency services are forwarded to the appropriate entities, even if the network or those entities are in overload conditions. The emergency proxies may authenticate and filter call setup requests to ensure that only proper call setup requests are forwarded to help prevent abusive, malicious or unauthorized use of emergency services. The emergency proxy may operate solely in a packet network, as well as at the interface between a packet network and a circuit-switched network to assist in call setup requests originating from either the packet network or the circuit-switched network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
FIG. 1 is a block representation of a communication environment according to one embodiment of the present invention.

With reference to FIG. 1, a communication environment 10 is provided wherein an originating element 12 is a communication device attempting to establish a call to a terminating element 14 via a packet network 16. For the present invention, the term "call" includes traditional voice-based calls, as well as media sessions, which include any type of data, audio, voice, or video based packet sessions. In the illustrated embodiment, the originating element 12 is supported by an emergency proxy 18, and the terminating element 14 may be supported by a proxy 20 in traditional fashion, wherein the emergency proxy 18 and the proxy 20 will act as liaisons for call or session establishment messages involving the respective devices.

Accordingly, the originating element 12 will send a call setup request configured to initiate a call between the originating element 12 and the terminating element 14. In traditional proxy fashion, the call setup request is received by the emergency proxy 18, which will determine if the call setup request meets the emergency criteria of an emergency call setup request. The emergency criteria are preferably provisioned by emergency services providers, such that these providers can effectively control how call setup requests are processed. If the emergency criteria are met, the emergency proxy 18 will modify the call setup request in a defined manner and forward the call setup request across the packet network 16 to initiate the call. The call setup request may be forwarded to the terminating element 14 directly or indirectly via the proxy 20. In one embodiment, the proxy 20 may be configured to analyze the call setup request to ensure that the call setup request is properly configured by the emergency proxy 18 as a condition to sending the call setup request to the terminating element 14. As such, the emergency proxy 18 and perhaps the proxy 20 are configured to process call setup requests from the originating element 12 to ensure that only authorized call setup requests result in emergency calls, by effectively filtering call setup requests actually delivered to the terminating element 14 or supporting entities.

Preferably, the emergency proxy 18 will authenticate the call setup request to ensure that the originating element 12 can initiate a request for an emergency call, as well as limit the call setup requests sent toward the terminating element 14 to those that are authenticated. The emergency proxy 18 may add an additional field, referred to in general as an emergency header field, to the call setup request. The emergency header field may include additional information that uniquely identifies the level of emergency, and information identifying the call, such as caller identification, to and from addresses, and the like. For additional security to avoid malicious or unauthorized use of emergency services, the emergency proxy 18 may encrypt the emergency header field information in a manner allowing the proxy 20, terminating element 14, or other supporting entity to be able to decrypt information when attempting to establish an emergency call. Notably, private or public key encryption techniques may be employed that are well known in the art. Authentication of call setup requests or an originating element 12 sending the call setup request may be based on the identity of the originating element 12, a user of the originating element 12, or authentication information provided when generating the call setup request. The emergency proxy 18 will be provisioned with the necessary information to facilitate authentication of the various originating elements 12 that are served by the emergency proxy 18.

Notably, the emergency proxy 18 may provide multiple levels of prioritization for various types of call setup requests and may filter call setup requests according to these priority levels and network conditions, as well as include indicia indicating an assigned prioritization level in each call setup request. The receiving proxy 20, terminating element 14, any other intermediate proxy or supporting entity, if any, will process the incoming call setup request according to the assigned prioritization level, network conditions, and the like.

In a preferred embodiment, at least a portion of the communication sessions established between the originating element 12 and the terminating element 14 are facilitated using the Session Initiation Protocol (SIP). The specification for SIP is provided in the Internet Engineering Task Force's Request for Comments (RFC) 3261: Session Initiation Protocol Internet Draft, which is incorporated herein by reference in its entirety. In general, SIP is used to establish media sessions between any number of endpoints, such as the originating and terminating elements 12, 14. Typically, these endpoints may support any number or combination of data, audio, and voice media sessions, depending on the configuration of the device. A SIP endpoint is capable of running an application, typically referred to as a user agent (UA), which is capable of facilitating media sessions using SIP.

In certain embodiments, user agents may register their ability to establish sessions with a SIP proxy, such as the emergency proxy 18 or proxy 20, by sending REGISTER messages to the SIP proxy. The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. Media capabilities may be exchanged in other messages, such as the SIP INFO message. Media capabilities are typically described using the Session Description Protocol (SDP). Once respective endpoints are in an active session with each other and have determined each other's capabilities, the specified media content may be exchanged during an appropriate media session.

According to the Internet Engineering Task Force's RFC 3261, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

Figure 2:
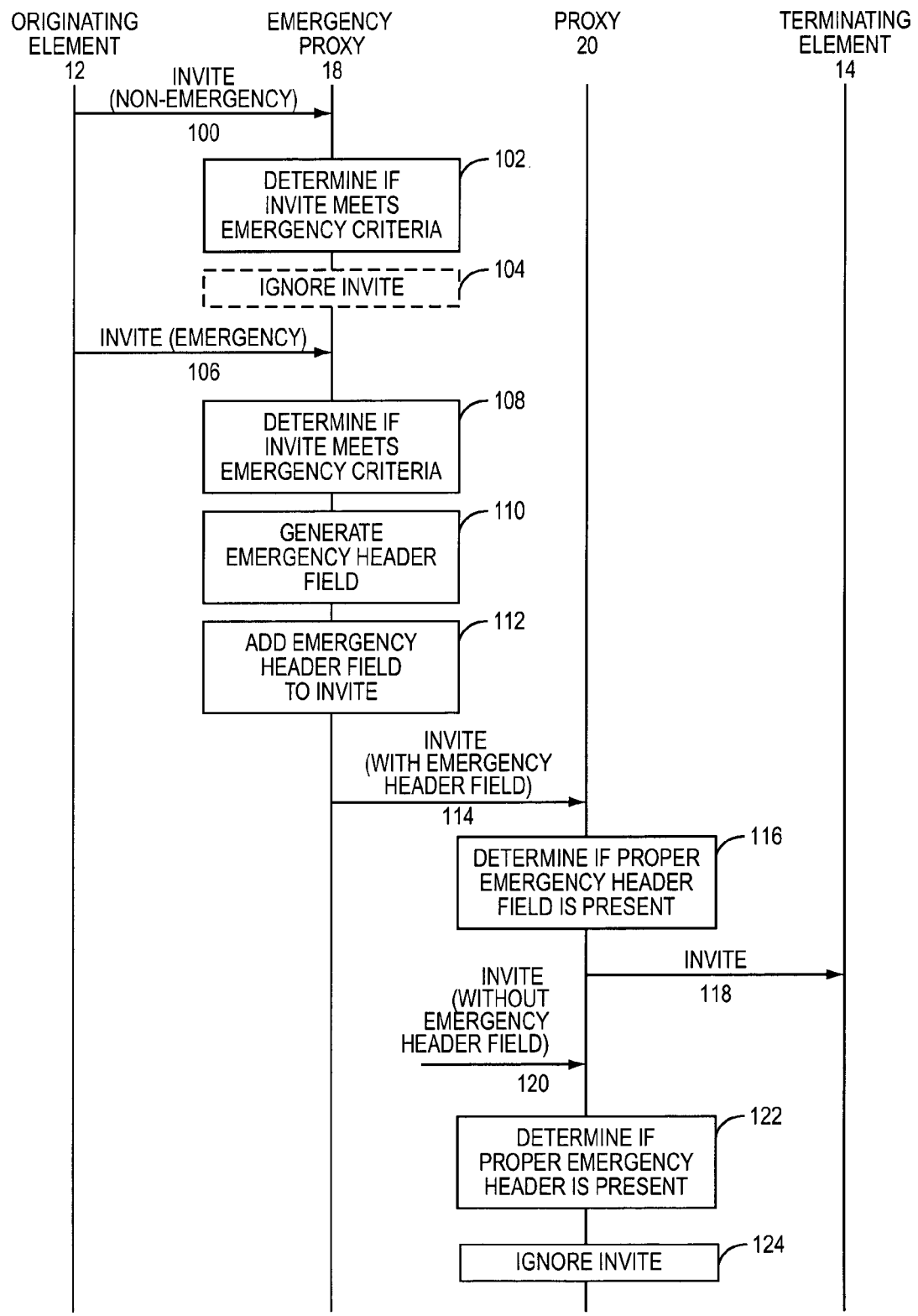
FIG. 2 is a communication flow diagram providing an exemplary scenario for implementing emergency services according to one embodiment of the present invention.

With reference to FIG. 2, a communication flow diagram is provided from an exemplary scenario wherein one or more originating elements 12 are sending call setup requests in the form of INVITE messages to initiate a call via a SIP session with one or more terminating elements 14. Assume that the terminating elements 14 provide emergency services and only emergency calls should be handled by the terminating elements 14. Accordingly, the emergency proxy 18 will only forward incoming call setup requests, in the form of SIP INVITE messages, which meet the necessary criteria for being emergency call setup requests to the terminating elements 14. Initially, assume that an INVITE message intended to establish a call with a terminating element 14 is sent from the originating element 12 (step 100). Further assume that the originating element 12 is either unauthorized to establish an emergency call or that the INVITE message would not meet the necessary criteria for establishing an emergency call. As such, the emergency proxy 18 will determine if the INVITE message meets the defined emergency criteria (step 102), and since this INVITE message would not meet the emergency criteria, the emergency proxy 18 will ignore the INVITE message and not forward the INVITE message toward the terminating element 14 (step 104). The emergency proxy 18 may be configured to provide a response indicative of not forwarding the INVITE message back to the originating element 12 (not shown)

Next, assume that an appropriate originating element 12 sends a proper INVITE message for initiating an emergency call to the terminating element 14. The emergency proxy 18 will receive the INVITE message (step 106), and determine if the INVITE message meets the emergency criteria (step 108). Since the INVITE message meets the emergency criteria, the emergency proxy 18 generates an emergency header field (step 110) and adds the emergency header field to the INVITE message (step 112). The INVITE message is then forwarded toward the terminating element 14 (step 114). Since the terminating element 14 is associated with a proxy 20, the proxy 20 will receive the INVITE message on behalf of the terminating element 14 and may be configured to determine if the proper emergency header field is present (step 116). If the proper emergency header field is present, the INVITE message is forwarded to the terminating element 14 wherein the session supporting the call can be established with the originating element 12 (step 118).

In the event that the proxy 20 receives an INVITE message without the proper emergency header field from any device (step 120), the proxy 20 will determine if the proper emergency header field is present (step 122), and since the field is not present, may ignore the INVITE message (step 124). As such, the emergency proxy 18 provides the proper authentication and filtering for call setup requests to ensure that terminating elements 14 providing emergency services are only sent appropriate call setup requests. Further, the proxy 20 supporting the terminating elements 14 may provide further authentication and filtering to ensure that the terminating element 14 only receives appropriate call setup requests. Again, further security may be provided using encryption and decryption techniques between the emergency proxy 18 and the proxy 20. The proxy 20 and the emergency proxy 18 may also monitor work conditions to help provide filtering for the various call setup requests, as well as prioritize the call setup requests based on any available criteria.

Figure 3:
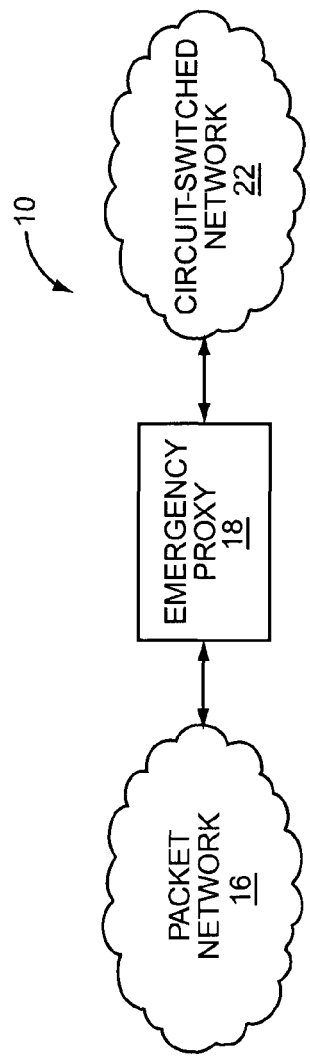
FIG. 3 is a block representation of a communication environment according a second embodiment of the present invention.

Turning now to FIG. 3, the concepts of the present invention readily extend to circuit-switched networks 22, such as the PSTN, wherein an emergency proxy 18 is implemented in or in association with a gateway facilitating an interface between the packet network 16 and the circuit-switched network 22. In such a configuration, the emergency proxy 18 can control circuit-switched call setup requests as well as packet-based call setup requests originating from the circuit-switched network 22 and the packet network 16, respectively.

Figure 4:
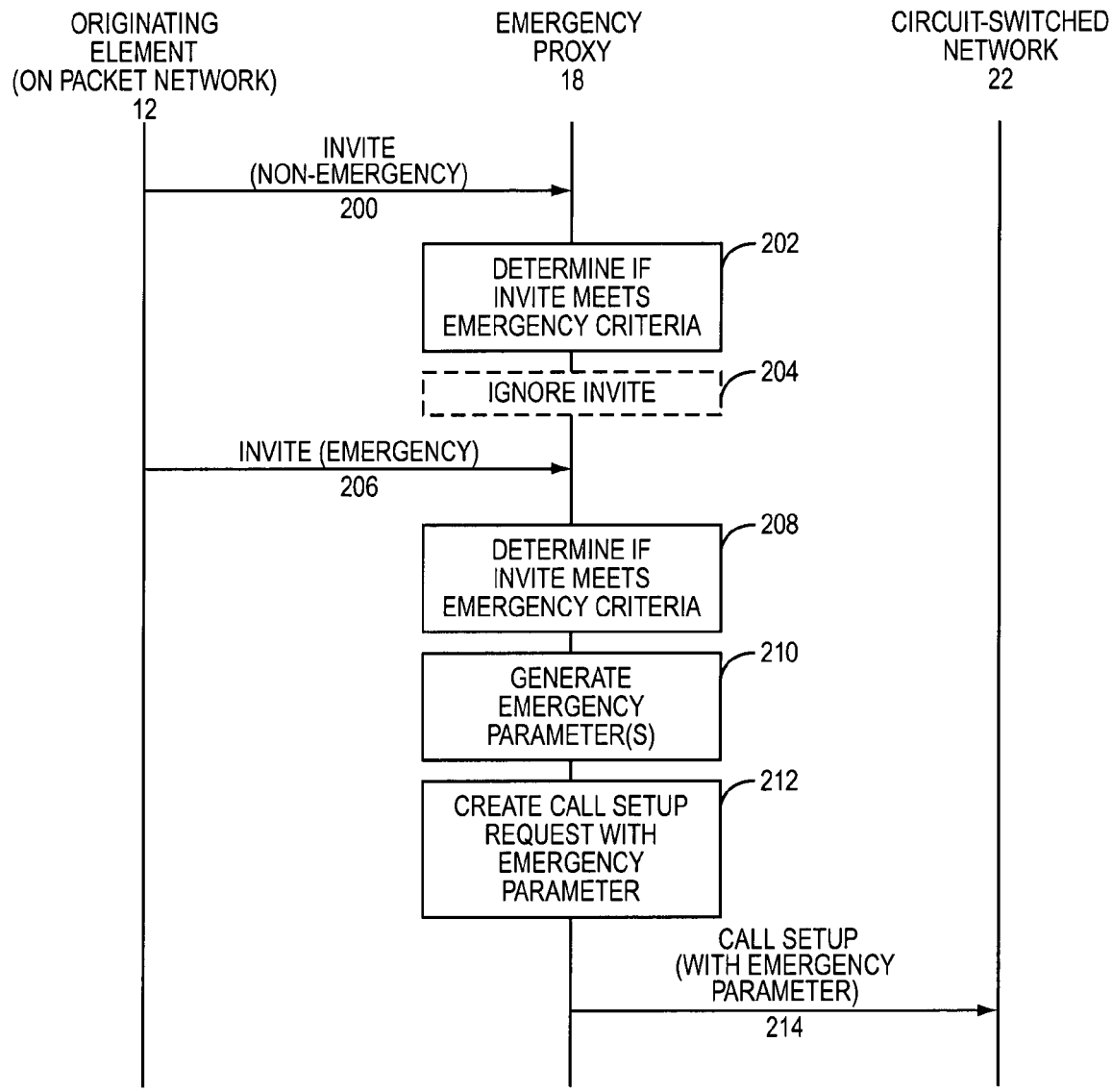
FIG. 4 is a communication flow diagram providing an exemplary scenario for implementing emergency services according to a second embodiment of the present invention.

An exemplary communication call flow for filtering call setup requests originating from the packet network 16 and intended for a device on the circuit-switched network 22 is provided in FIG. 4. In this example, an initial INVITE message, which does not meet the emergency criteria, is sent from the originating element 12 to establish an emergency call with a device in the circuit-switched network 22. The emergency proxy 18 will receive the INVITE message (step 200) and determine if the INVITE message meets the emergency criteria (step 202). Since the emergency criteria are not met, the emergency proxy 18 will ignore the INVITE message (step 204) and perhaps report the same back to the originating element 12 (not shown).

When an appropriate INVITE message is sent from an originating element 12 (step 206), the emergency proxy 18 will receive the INVITE message and determine if the INVITE message meets the emergency criteria (step 208). Since the emergency criteria is met, the emergency proxy 18 may generate one or more emergency parameters (step 210) and create a call setup request with the emergency parameter (step 212), wherein the call setup request is configured to initiate a call in the circuit-switched network 22. An exemplary call setup request for the PSTN is an intelligent network Initial Address Message (IAM). As such, the emergency proxy 18 will send a call setup request to the appropriate entity in the circuit-switched network 22 to initiate the emergency call (step 214). The call setup request will include the emergency parameters to assist the entities in the circuit-switched network 22 in determining whether the call setup request is appropriate. The emergency parameters may be carried in signaling information elements as specified by the appropriate standards that define the Multi-Level Precedence and Preemption Supplementary Service, which is well known and provides for prioritizing voice traffic.

Figure 5:
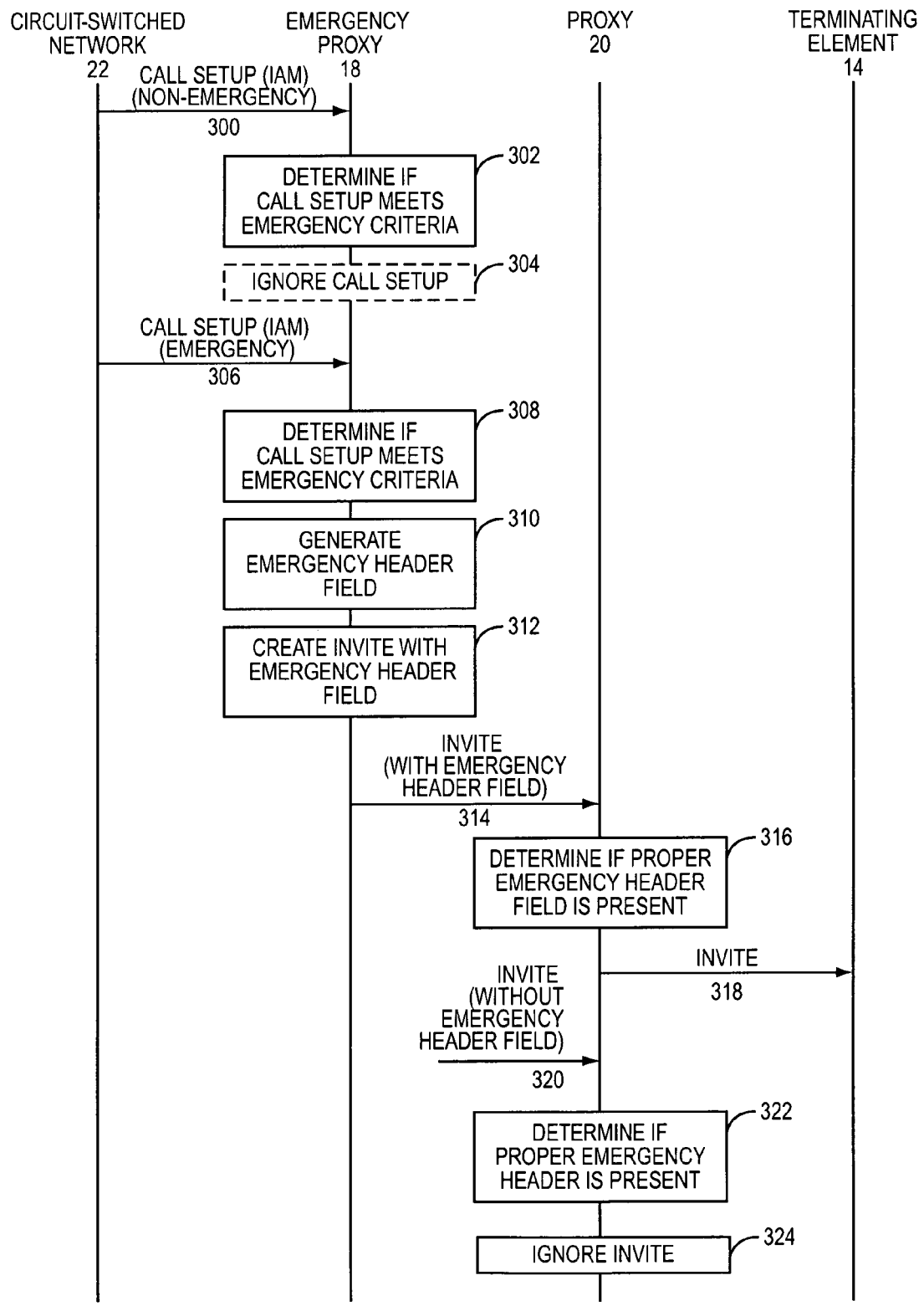
FIG. 5 is a communication flow diagram providing an exemplary scenario for implementing emergency services according to a third embodiment of the present invention.

Turning now to FIG. 5, assume that entities in the circuit-switched network 22 are attempting to establish emergency calls with a terminating element 14 in the packet network 16. Accordingly, call setup requests in the form of IAMs are received by the emergency proxy 18 from the circuit-switched network 22 (step 300). Assume that the first call setup request would not meet the emergency criteria for establishing an emergency call with the terminating element 14, and as such, the emergency proxy 18 will determine that the call setup request does not meet the emergency criteria (step 302) and will ignore the call setup request (step 304). Again, the call setup request may be an IAM, which may include various parameters to assist in determining whether the emergency criteria are met.

Assume that another call setup request, which would meet the emergency criteria, is received by the emergency proxy 18 from the circuit-switched network 22 (step 306). The emergency proxy 18 will determine if the call setup request meets the emergency criteria (step 308) and since it does meet the emergency criteria, the emergency proxy 18 will generate an emergency header field (step 310) and create an INVITE message intended for the terminating element 14 with the emergency header field (step 312). The emergency proxy 18 will then send the INVITE message with the emergency header field toward the terminating element 14. The proxy 20 will receive the INVITE message (step 314) and may be configured to determine if a proper emergency header field is present (step 316). If the proper emergency header field is present, the INVITE message is forwarded to the terminating element 14 to establish the emergency call (step 318). Notably, the session between the emergency proxy 18 or associated gateway and the terminating element 14 may be a SIP session, wherein the connection within the circuit-switched network 22 will be a circuit-switched connection. As described above, the proxy 20 may receive INVITE messages without the proper emergency header field (step 320), and then determine if the proper emergency header is present (step 322). When the proper emergency header field is not present, the INVITE message may be ignored (step 324).

With any of the above embodiments, the emergency proxy 18 will preferably be configured to ensure that a proper call setup request is always forwarded to or towards the terminating element 14, even in overload conditions. Further, in non-overload conditions, the emergency proxy 18 as well as the proxy 20 may be configured to forward all of select INVITE messages or forward them based on desired criteria, yet prioritize emergency requests as well as eliminate non-emergency requests during overload conditions.

Figure 6:
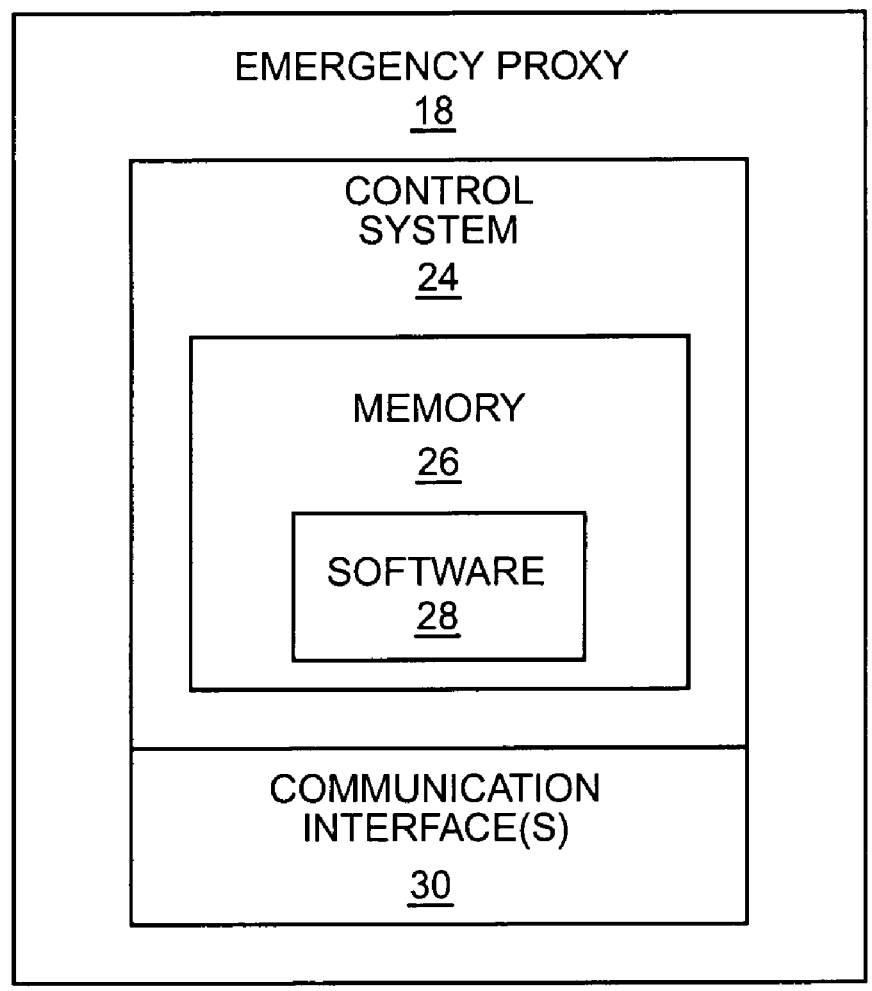
FIG. 6 is a block representation of an emergency proxy according to one embodiment of the present invention.

With reference to FIG. 6, a high level block diagram of an emergency proxy or device capable of performing the function of an emergency proxy is illustrated. The emergency proxy 18 will typically include a control system 24 having memory 26 for storing the necessary software 28 to facilitate the above functionality. The control system 24 will also be associated with one or more communication interfaces 30 for communicating over the packet network 16, and perhaps the circuit-switched network 22, as necessary.

Those skilled in the art will recognize improvements and modifications to the preferred embodiments of the present invention. All such improvements and modifications are considered within the scope of the concepts disclosed herein and the claims that follow.

What is claimed is:

1. A method for controlling access to emergency services comprising:

a) receiving call setup requests from at least one originating device;

b) determining select call setup requests from the call setup requests that are received from users who are authorized to initiate a call for emergency services;
c) selecting a priority level from a plurality of priority levels for each of the select call setup requests;
d) creating emergency information for each of the select call setup requests based on the determination;
e) inserting the emergency information and the selected priority levels into the select call setup requests; and
f) forwarding the select call setup requests toward at least one terminating device associated with the emergency services, wherein the emergency information is inserted into the select call setup requests prior to forwarding the select call setup requests toward the at least one terminating device where one of the at least one originating or terminating devices resides on a packet network.

2. The method of claim 1 wherein ones of the call setup requests that are not the select call setup requests are not forwarded toward the at least one terminating device.

3. The method of claim 1 wherein the emergency information is provided in an emergency header field of the select call setup requests.

4. The method of claim 1 wherein the emergency information inserted into the select call setup requests is encrypted.

5. The method of claim 1 wherein the select call setup requests are sent toward the at least one terminating device when the at least one terminating device is in an overload condition.

6. The method of claim 1 wherein the call setup requests are sent toward the at least one terminating device when network elements involved in forwarding the call setup requests are in an overload condition.

7. The method of claim 1 wherein the call setup requests are processed with a higher priority by any network element that receives them.

8. The method of claim 1 wherein forwarding the select call setup requests toward the at least one terminating device comprises sending the select call setup requests to a proxy for the at least one terminating device.

9. The method of claim 1 wherein the call setup requests are received over the packet network and the select call setup requests are forwarded toward the at least one terminating device over the packet network.

10. The method of claim 1 wherein the call setup requests are received over the packet network and the select call setup requests are forwarded toward the at least one terminating device over a circuit-switched network.

11. The method of claim 10 wherein the select call setup requests forwarded toward the at least one terminating device over the circuit-switched network are initial address messages.

12. The method of claim 10 wherein the call setup requests are session initiation protocol INVITE messages.

13. The method of claim 1 wherein the call setup requests are received over a circuit-switched network and the select call setup requests are forwarded toward the at least one terminating device over the packet network.

14. The method of claim 13 wherein the call setup requests are initial address messages.

15. The method of claim 13 wherein the select call setup requests forwarded toward the at least one terminating device are session initiation protocol INVITE messages.

16. A system for controlling access to emergency services comprising:
a) at least one communication interface; and
b) a control system associated with the at least one communication interface and adapted to:
i) receive call setup requests from at least one originating device;
ii) determine select call setup requests from the call setup requests that are received from users who are authorized to initiate a call for emergency services;
iii) select a priority level from a plurality of priority levels for each of the select call setup requests;
iv) create emergency information for each of the select call setup requests based on the determination;
v) insert the emergency information and the selected priority levels into the select call setup requests; and
vi) forward the select call setup requests toward at least one terminating device associated with the emergency services, wherein the emergency information is inserted into the select call setup requests prior to forwarding the select call setup requests toward the at least one terminating device where one of the at least one originating or terminating devices resides on a packet network.

17. The system of claim 16 wherein ones of the call setup requests that are not the select call setup requests are not forwarded toward the at least one terminating device.

18. The system of claim 16 wherein the emergency information is provided in an emergency header field of the select call setup requests.

19. The system of claim 16 wherein the emergency information inserted into the select call setup requests is encrypted.

20. The system of claim 16 wherein the select call setup requests are sent toward the at least one terminating device when the at least one terminating device is in an overload condition.

21. The system of claim 16 wherein the call setup requests are sent toward the at least one terminating device when network elements involved in forwarding the call setup requests are in an overload condition.

22. The system of claim 16 wherein the call setup requests are processed with a higher priority by any network element that receives them.

23. The system of claim 16 wherein to forward the call setup requests toward the at least one terminating device, the control system is further adapted to send the select call setup requests to a proxy for the at least one terminating device.

24. The system of claim 16 wherein the call setup requests are received over the packet network and the select call setup requests are forwarded toward the at least one terminating device over the packet network.

25. The system of claim 16 wherein the call setup requests are received over the packet network and the select call setup requests are forwarded toward the at least one terminating device over a circuit-switched network.

26. The system of claim 25 wherein the select call setup requests forwarded toward the at least one terminating device over the circuit-switched network are initial address messages.

27. The system of claim 25 wherein the call setup requests are session initiation protocol INVITE messages.

28. The system of claim 16 wherein the call setup requests are received over a circuit-switched network and the select call setup requests are forwarded toward the at least one terminating device over the packet network.

29. The system of claim 28 wherein the call setup requests are initial address messages.

30. The system of claim 28 wherein the select call setup requests forwarded toward the at least one terminating device are session initiation protocol INVITE messages.

31. A non-transitory computer readable media with software for controlling access to emergency services, said software comprising instructions for a control system to:
  a) receive call setup requests from at least one originating device;
  b) determine select call setup requests from the call setup requests that are received from users who are authorized to initiate a call for emergency services;
  c) select a priority level from a plurality of priority levels for each of the select call setup requests;
  d) create emergency information for each of the select call setup requests based on the determination;
  e) insert the emergency information and the selected priority levels into the select call setup requests; and
  f) forward the select call setup requests toward at least one terminating device associated with the emergency services, wherein the emergency information is inserted into the select call setup requests prior to forwarding the select call setup requests toward the at least one terminating device where one of the at least one originating or terminating devices resides on a packet network.

* * * * *

UNITED STATES PATENT AND TRADEMARK OFFICE
CERTIFICATE OF CORRECTION

| | | |
|---|---|---|
| PATENT NO. | : 7,899,174 B1 | |
| APPLICATION NO. | : 10/606687 | |
| DATED | : March 1, 2011 | |
| INVENTOR(S) | : Cristian Constantinof | |

It is certified that error appears in the above-identified patent and that said Letters Patent is hereby corrected as shown below:

In column 9, at line 1, replace "media" with --medium--.

Signed and Sealed this
Twenty-seventh Day of September, 2011

David J. Kappos
*Director of the United States Patent and Trademark Office*